July 31, 1934.  A. J. SLADE  1,968,715
EXPANSIBLE JOINT STRUCTURE
Filed July 22, 1932  2 Sheets-Sheet 1
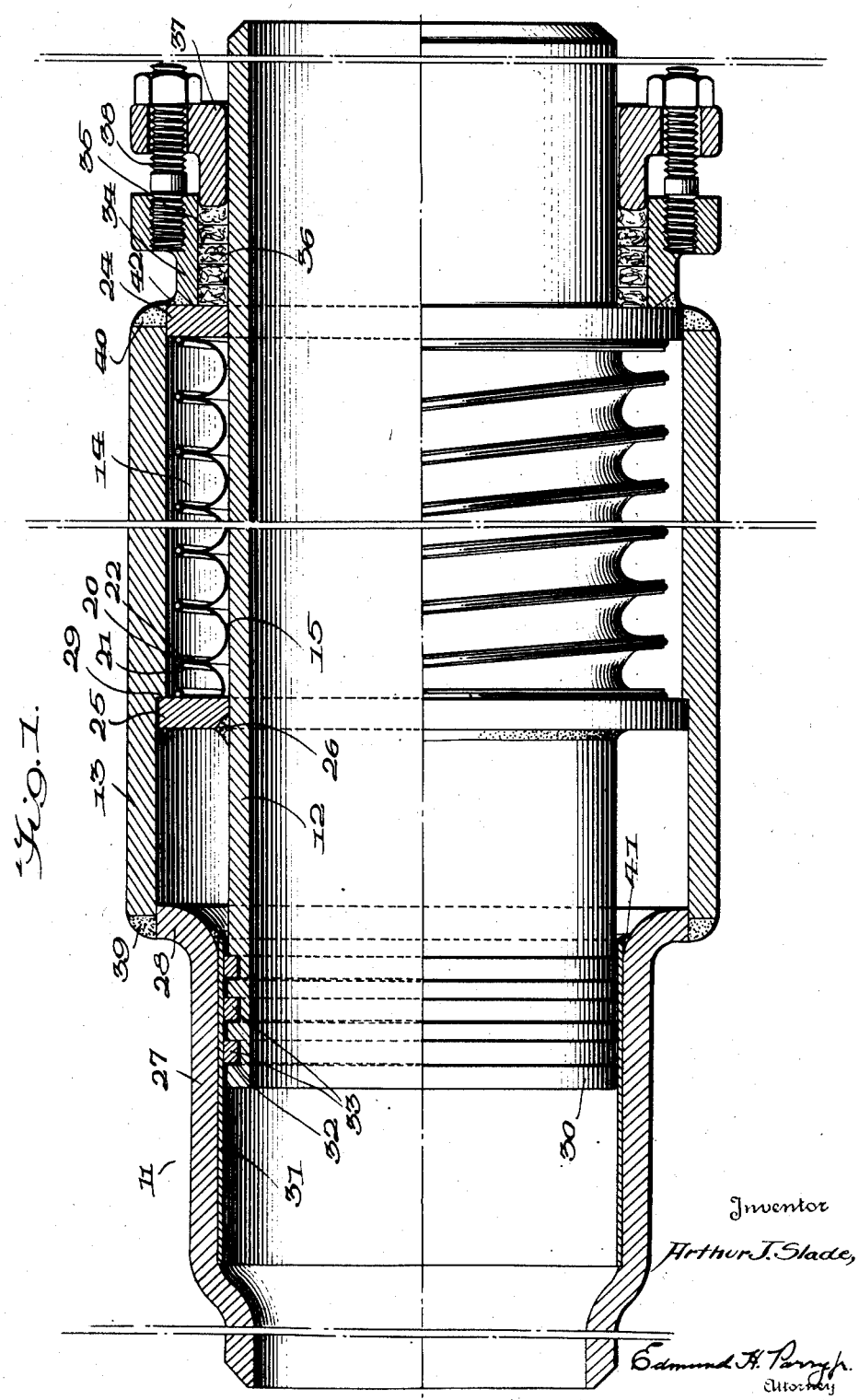
Inventor
Arthur J. Slade,
Edmund H. Parry Jr.
Attorney July 31, 1934.  A. J. SLADE  1,968,715
EXPANSIBLE JOINT STRUCTURE
Filed July 22, 1932  2 Sheets-Sheet 2
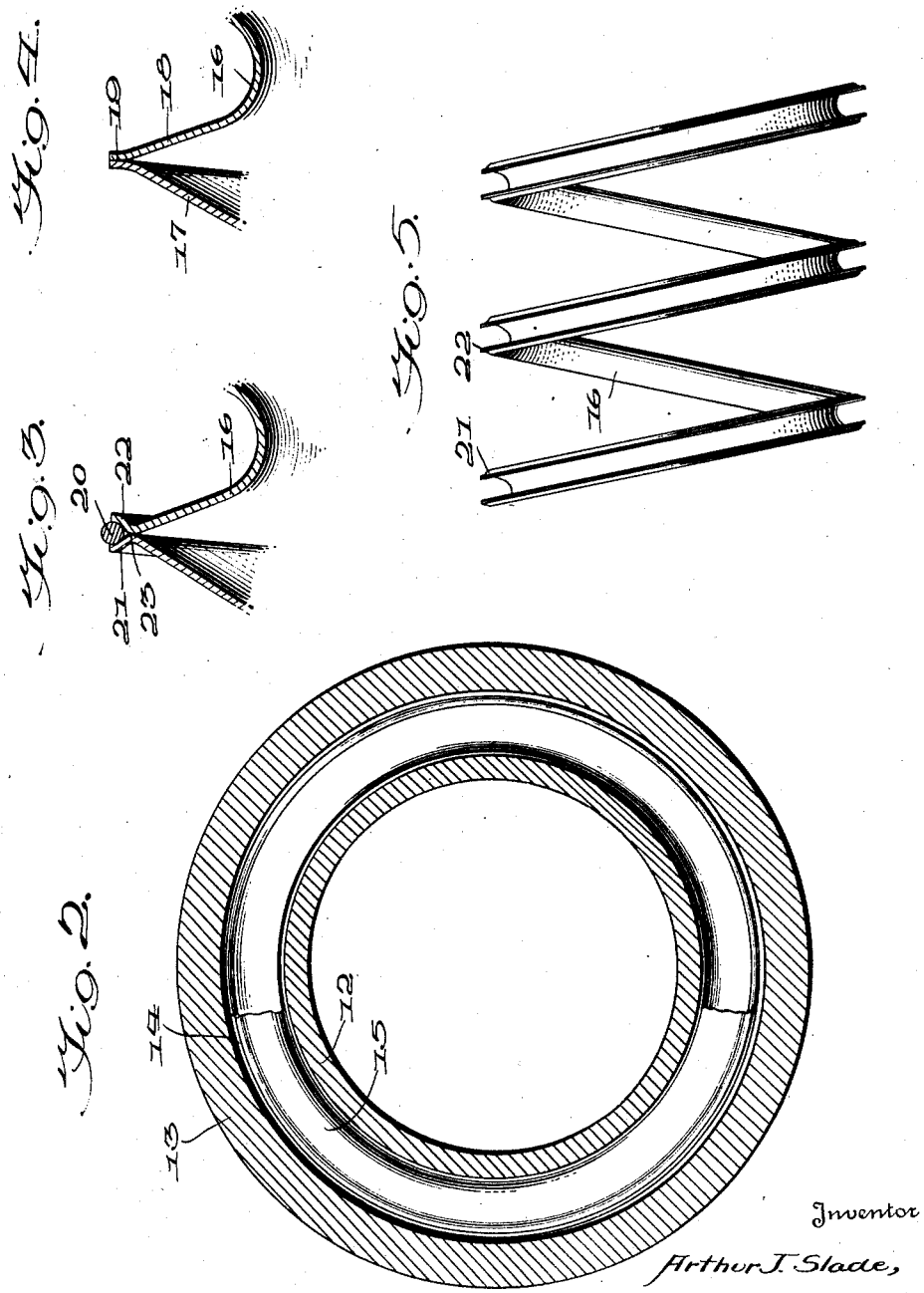

Patented July 31, 1934

1,968,715

UNITED STATES PATENT OFFICE 1,968,715

EXPANSIBLE JOINT STRUCTURE

Arthur J. Slade, North Tonawanda, N. Y.

Application July 22, 1932, Serial No. 624,134

9 Claims. (Cl. 285—162)

This invention relates to expansible joint structures, and particularly to expansion joints for pipe installations conveying hot and cold fluids wherein provision must be made to compensate for longitudinal expansive and contractive movement under changes in temperature. It involves a novel organization and arrangement of parts suited to the requirements of an expansion joint, and is directed particularly to an improved flexible joint member which is useful in this and in other associations to provide a yielding connection between parts which must be capable of relative movement.

The primary object of the invention is to provide a flexible joint member adapted to use in expansion joints and the like of great flexibility in which strains produced under expansive and contractive movement will be uniformly distributed throughout its whole length and area, the construction being such that the member will not be susceptible to failure even under extreme conditions of movement, pressure and temperature.

It is a further purpose of the invention to provide an expansion joint with a flexible sealing member and auxiliary sealing means in an arrangement such that the flexible member is not in direct communication with the interior or exterior of the joint and, therefore, not subject to the deteriorating action of fluid or foreign matter or the destructive force of pressure surges, the auxiliary sealing means also functioning to prevent leakage of the joint in case of break down of the flexible member.

Additional important objects of the invention are the provision of a compact expansion joint which need be only slightly larger in diameter than the pipe sections with which it is to be associated, the same being rigidly guided and otherwise constructed so as not to be subject to injury under changes in condition of the piping; and, the provision of an expansion joint of the packless type free from all bolts and flanged joints and of such design that such joints as are necessary are not subject to destructive strain at any stage of the expansive and contractive movement of the structure even when high pressure conditions exist.

The expansion joint of the present invention falls within the class of packless joints, which are so designated to distinguish them from the slip type joints wherein telescoping sections are sealed by non-metallic packing. There are two types of packless joints now in general use, the first of which utilizes a flexible member constituting a length of corrugated tubing of copper, steel or other suitable metals, or alloys thereof, relatively heavy stock being required so that the member will withstand strain resulting from fluid pressure within the joint when the same is in service. The other conventional type of packless joint also utilizes flexible material as a seal, the same being formed as one or a series of diaphragms or annuluses, which are sometimes reinforced or supported to better withstand pressure and strains incident to flexing movement.

There are various serious objections to the several types of packless expansion joints just referred to. A frequent cause of failure, common to both, is their inability to distribute and absorb uniformly throughout their entire length and area strains resulting from pressure conditions and expansive and contractive movement. Such strains tend to concentrate in one or more localized areas of the flexible members which are thereby weakened and caused to break down. In case such members are defective in any portion the strain is likely to center thereat with the result that the utility of the member will quickly be destroyed. The conventional corrugated expansion member is not adequately flexible, and, being necessarily of heavy material, readily loses what flexibility it possesses, with the result that the member will soon weaken or crack when in use so as to permit leakage or a blow out. Where the sealing means for the expansion joint comprises one or a series of spaced annuluses or diaphragms, the flexible elements must be supported by flanged joints and bolts which are objectionable, and strains concentrate in the elements at such joints which cause them to crack. If a flexible member comprising a connected series of annuluses is resorted to they must be joined together alternately at their inner and outer peripheries to produce inner and outer sets of joints at least one set of which must be subject to severe strain from the fluid pressure within the joint. If the diaphragms are reinforced or supported they are rendered less flexible when flexibility is an important factor in their proper operation.

A flexible member adapted to be used in packless expansion joints and the like will, according to my invention, be constructed to have all the advantages of both the diaphragm and corrugated types without the accompanying disadvantages. The same does not constitute a mere improvement on either of such conventional constructions but provides a distinct new type possessed of great flexibility and strength in which strains and movement will be equally distributed over its entire area. It is so designed that it will not be subject to permanent distortion, and the parts are so disposed that fluid pressure merely causes the parts to mutually reinforce each other.

In attaining the features and advantages of construction just referred to, I make a flexible member of one or more strips of resilient metal which are wound spirally to form a tubular construction, the edges of adjacent convolutions being secured together as by welding to constitute a fluid and pressure proof unit. The strips should have a U-shaped cross-section as this is the natural shape that would be assumed by a sheet or vessel when subjected to fluid pressure. The edges of all convolutions of the strip will extend in the same direction and can be united to form a strong joint by welding the sides of adjacent convolutions in the region of the edges. In order that the member may best counteract the destructive force of pressure the edges will face towards the side of the member which receives the pressure. Under such arrangement the pressure will bear against the hollow portion of the U-shaped strip and cause the sides of adjacent convolutions to bear against and support each other without any strain whatsoever on the joints between convolutions. A spiral spring-like reinforcing element conforming to the convolutions of the flexible member may be provided which, besides reinforcing the structure, will insure an even distribution throughout the length of the member of strains resulting from the expansive and contractive movement of the pipe sections with which the joint is associated.

My expansion joint will, as conventionally, comprise a pair of telescoping members, the outer of which has a portion of enlarged diameter constituting an annular chamber in which the flexible member is disposed. Because of the U-shaped cross-section and great flexibility of such member, it need not have a great depth between its inner and outer peripheries so that the height of the annular chamber may be correspondingly small, thus enabling the expansion joint to be made with a diameter only slightly greater than that of the pipe installation with which it is to be associated.

The members of the joint should telescopically engage beyond both extremities of the expansion chamber so as to rigidly support each other at all times under the expansive and contractive movement of the pipe installation. Auxiliary sealing means may be interposed between the members in such portions to supplement the flexible sealing member and prevent leakage of the joint in case of a break in the latter. The auxiliary sealing means will also prevent fluid and foreign matter from coming in contact with the flexible member, and additionally, the sealing means located between the expansion chamber and the interior of the joint will render the flexible member immune to the destructive force of pressure surges within the joint.

To limit the movement of the members of the expansion joint a stop is provided within the expansion chamber beyond one end of the flexible member, the cooperating parts constituting the stop being completely enclosed and enabling an arrangement which is far simpler and more satisfactory than conventional stop structures which are located exteriorly of the joint.

While it is desirable and in some instances necessary to construct my joint of separate parts, it is contemplated that welding should be used throughout, thus eliminating the necessity of numerous bolts, gaskets and flanged joints.

Having now generally described my invention I will proceed with a detailed description of one embodiment thereof, as shown in the accompanying drawings, in which:

Fig. 1 is a longitudinal view partly in elevation and partly in section showing an expansion joint embodying the various features of my invention;

Fig. 2 is a cross-section taken on the central broken line of Fig. 1;

Figs. 3 and 4 are corresponding fragmentary views of several embodiments of the construction of my flexible member; and Fig. 5 shows the formation of my flexible member showing the manner in which the same is formed.

In Figures 1 and 2 I have illustrated an expansion joint comprising inner and outer telescoping sections generally designated by the reference numerals 11 and 12. In the portion of its length comprehended by the wall 13, the outer joint member is of enlarged diameter to provide an annular chamber 14. The construction so far described is conventional in various types of packless expansion joints.

Located in the chamber 14 is a flexible tubular member 15 adapted to form a seal between the inner and outer members of the joint. As heretofore generally set forth such flexible member comprises one or more strips of resilient metal, such as indicated by the reference numeral 16 in Figure 5, wound spirally and with the edges of adjacent convolution joined together. The strip may comprise copper but preferably it is made of steel or some other metal or metal alloy which is possessed of an inherent resiliency. The strip may be of any width and gauge although I prefer to utilize material about two and one-half inches wide and one thirty-second of an inch thick. One strip of metal is preferably used in making the entire length of the flexible member in order to avoid unnecessary joints. On the other hand, it is entirely possible to utilize two or more strips in the multiple convolutions to secure the desired length. The strip is formed in any suitable machine which will coil the same into a series of uniform convolutions of the desired diameter.

In order that the flexible member 15 be flexible and capable of expansive and contractive longitudinal movement, the strip of which it is made is pre-formed with a U-shaped cross-section with the edges of adjacent convolutions extending either inwardly or outwardly in the same direction. The desired cross-sectional shape may be imparted to the strip prior to, during or subsequent to the coiling operation, depending upon what type of machines are available.

For reasons which will more fully appear hereinafter, the edges of the strip will face inwardly if the pressure within the expansion joint will bear against the inner periphery of the member, or the edges will be turned outwardly if, as now seems preferable, the pressure is to be applied against the outer surface of the flexible member. The latter construction is illustrated in Figure 1.

After the flexible strip has been coiled in the manner illustrated in Figure 5, the outer sides of successive convolutions are joined adjacent their edges, preferably by welding. By reason of the U-shaped cross-section the sides of adjacent convolutions will be in contact for a short distance adjacent the edges as illustrated in Figure 4. In such figure the reference characters 17 and 18 represent the adjoining sides of adjacent convolutions of the strip 16, these being in contact adjacent their edges as indicated at 19. Of course, the exact shape of the strip will determine for what portion of their extent the sides of the convolutions will contact. A joint will be made by welding, soldering, or brazing the convolutions along their edges in the contacting area 19. Such joint, it being understood, continues spirally throughout the length of the flexible member.

To reinforce the flexible member 15 it may be desirable to associate therewith a wire reinforcing element 20 which is wound spirally and in conformity with the convolutions of the flexible member. This element, in order not to interfere with the proper operation of the flexible member may be secured along the spirally extending joint between successive convolutions. For this purpose the strip 16, during the shaping operation, is provided with inturned edges 21 and 22, as shown in Figure 5. When adjacent convolutions are brought together the inturned edges of the U-shaped strip will form a channel such as shown in Figure 3, which provides a suitable seat for the reinforcing element 20. The sides of the strip interiorly of the recess in the area 23 are joined to complete the assembly of the flexible member.

It may or may not be necessary to secure the reinforcing wire in association with the flexible member throughout their entire length but in any case they will be secured together at their ends. The wire 20 under the arrangement just described will reinforce the flexible member circumferentially. To give reinforcement longitudinally and insure distribution of strains throughout the length of the flexible member the reinforcing element 20 should be strong and of resilient spring-like quality. Heavy gauge steel wire may be used.

The complete flexible member including the reinforcing element is shown operatively positioned in the chamber 14 in the expansion joint of Figure 1. In order that the flexible member form a seal for the expansion joint, the same is secured as by welding between the annular end wall 24 of the outer joint member 11 and an annular ring 25 which is slidable in the chamber 14 and secured at 26 to the inner joint member 12.

The arrangement of parts of the expansion joint in Figure 1 is such that the pressure will be applied in the chamber 14 against the outer surface of the flexible member 15. It is for this reason that the joints between the adjacent U-shaped convolutions face outwardly. With such an arrangement the pressure will not tend to separate the joint between convolutions but will bear against the hollow curved surface thereof. It will be appreciated that the sides of adjacent convolutions for so much of their extent inwardly of their edges as they are in contact will provide a pressure equalization so that the only strain produced in the flexible member by pressure will be in the portions of the convolutions which are free and unsupported. The inner curved ends will, particularly under high pressures, seat against the wall of the inner joint member 12, and under such circumstances the only effect of pressure which might tend to distort the member will be localized in the small areas along the sides of the convolutions between the inner curved ends and the points where the sides come in contact with the sides of adjacent convolutions. The higher the pressure the smaller will be such free areas since the pressure in opposite directions against adjacent sides tends to increase their area of contact.

It will be seen from what has just been stated that the construction of my flexible member 15 is admirably suited to use in expansion joints and in other connections particularly under conditions of high pressure. Of course, if the pressure is to be applied against the inner surface of the member the edges of adjacent convolutions and the hollow U-shaped portion therebetween will face inwardly. By reason of the particular shape of the convolutions and the continuous winding thereof from end to end of the member, I have provided a construction which possesses great flexibility which, either with or without the addition of the reinforcing element 20, will distribute strains resulting from movement equally throughout the length of the member.

To limit the movement of the expansible member 15 in the expansion joint of Figure 1, I prefer to provide stops which are located interiorly of the joint. The end section 27 of the outer joint member 12 is provided with an outwardly flaring lip 28 which is joined to the wall 13 and forms an end wall for the chamber 14. As heretofore described, the inner joint member 12 is provided with an annular ring 25 which supports one end of the flexible member 15 and which is slidable in the chamber 14. The inner diameter of the chamber wall 13 is enlarged for a portion of its length to provide a shoulder 29. The ring 25 slides in the enlarged portion of the chamber between such shoulder and the end 28 which limit its longitudinal movement and thereby constitute a stop to limit the expansive and contractive movement of the flexible member 15 and the joint sections 11 and 12.

As illustrated in the figure the joint members 11 and 12 mutually support each other beyond each end of the expansion chamber, the inner member 12 being in sliding engagement with the respective end members 24 and 27 of the outer joint member 11. With such an arrangement the expansion joint will not be strained or rendered inoperative due to movement or shifting of the pipe installation with which it may be associated. The end member 27 is of sufficient length to support the end portion 30 of the inner joint member 12 at all stages of their relative longitudinal movement, and to prevent friction is provided on its inner surface with a phosphor bronze liner 31.

Between the contacting end portions 27 and 30 of the inner and outer joint members which lie between the flexible member 15 and the interior of the joint, I propose to provide auxiliary sealing means in the form of one or more packing elements 32. Such elements will be supported in recesses 33 formed in one of the contacting surfaces of either the end 27 or the end 30 so that the packing elements will make a sliding and sealing contact with the surface of the other. The packing elements may be in the form of resilient rings which will make a close fit with the phosphor bronze liner 31 and at the same time readily slide therein. The auxiliary sealing means will serve to prevent the circulation of fluid in the chamber 14 which houses the flexible member, and thus eliminate any deteriorating action of the fluid or any foreign matter contained therein on the flexible member. Even though the auxiliary packing does not constitute a perfect seal, it will satisfactorily serve the purpose just described and, what is more important, will prevent the destructive force of pressure surges from injuring the flexible member.

Adjacent the end 24 of the outer joint member it may be desirable to locate an additional auxiliary sealing means. For this purpose I provide an annular ring 34 of sufficiently large diameter to form an annular chamber 35 adapted to receive packing 36. The packing 36 may be held in the chamber by a gland element 37 which is adjustably secured to the ring 34 by a series of bolts 38. The packing element will bear against the surface of the inner joint member 12 and such construction will prevent foreign matter or fluid from the outside of the joint entering the expansion chamber 14. The packing 34 at one end of the expansion chamber and the packing rings 33 at the other end will therefore serve to minimize any destructive influences on the expansible member 15 and, further, will prevent leakage of the expansion joint in case of break down of the expansible member.

By reason of the shape of the flexible member 15 above described the same may be included in an annular chamber of small height. Thus the chamber 14 of the expansion joint may be made of far smaller diameter than the chamber of conventional expansion joint structures. This feature is valuable in that the joint may be made more compact and only slightly larger than the pipe installation with which it is associated. Such advantage is of great importance where the available space for installation is limited.

It is contemplated that all joints in my expansion joint, as above described, be made by welding which will eliminate the necessity of a multiplicity of flanges, gaskets and bolts, and also enable the joint to be made more compact. Thus, it will be noted that in Figure 1 the ends of the expansion chamber wall 13 are joined by welding at points 39 and 40 to the respective ends 27 and 24 of the outer joint member, no flanges being necessary for this purpose, the ends being merely slightly overlapped and provided with a heavy weld. The liner 31 for the end 27 of the outer joint is also secured by welding, as indicated by the reference character 41. The annular ring 25 is secured to the inner joint member by welding, as indicated at 26. The ring 24 for the packing chamber 35 is secured to the end 24 of the outer joint member at 42, such joint being made in common with the joint 40 between the end member 24 and the expansion chamber wall 13.

It will be appreciated that my invention is capable of a considerable range of modification and equivalency and that the drawings merely are illustrative of one embodiment thereof. I therefore do not intend to be limited in the practice of my invention further than may be required by the appended claims.

I claim:

1. An expansible joint structure comprising a tubular member consisting of a flexible metallic strip of U-shaped cross-section wound spirally into a series of convolutions which are united in a continuous spiral joint, the edges of the strip in adjacent convolutions beyond the joint being bent away from each other to provide a channel therebetween, and a resilient wire reinforcing element extending spirally of the tubular member seating in said channel.

2. An expansion joint comprising a pair of tubular joint members slidable one within the other, an annular chamber between the joint members, and a flexible sealing member located in the annular chamber comprising a flexible metallic strip of U-shaped cross-section wound spirally into a series of convolutions which are united at their outer sides adjacent their edges by a continuous spiral joint to constitute a tubular structure, and a resilient wire reinforcing element extending along and secured to the spiral joint of the tubular member adapted to insure uniform flexing of the member as the joint contracts and expands, said flexible tubular member and said reinforcing wire both being joined at their ends to the respective joint members.

3. An expansion joint comprising a pair of tubular joint members slidable one within the other, an annular chamber between the joint members, a flexible sealing member located in the annular chamber and joined at its ends to the respective joint members comprising a flexible metallic strip of U-shaped cross-section wound spirally into a series of convolutions the outer sides of which are united adjacent their edges by a continuous spiral joint to constitute a tubular structure, the edges of the convolutions of the strip facing an the side of the tubular member which will be subject to fluid pressure from within the expansion joint.

4. An expansion joint comprising a pair of tubular joint members slidable one within the other, an annular chamber between the joint members, a flexible sealing member located in the annular chamber comprising a flexible metallic strip of U-shaped cross-section wound spirally with its edges facing outwardly into a series of convolutions, the adjacent convolutions being joined along their edges in a continuous spiral joint to form a tubular structure, said flexible tubular member being secured at its ends to the respectvie joint members in such manner that fluid pressure from within the expansion joint will bear against the outer surface of the flexible tubular member.

5. An expansion joint comprising a pair of tubular joint members slidable one within the other, the outer joint member having a portion of enlarged diameter providing an annular chamber between the inner and outer members, an annular ring slidable in said channel secured to the inner joint member, and a flexible sealing member comprising a flexible metallic strip of U-shaped cross-section wound spirally with its edges facing outwardly into a series of convolutions, the edges of adjacent convolutions being secured in a continuous spiral joint to form a tubular structure, said flexible tubular member being located in the annular chamber and secured between the annular ring and the end of the annular chamber adjacent the outer end of the outer joint member.

6. An expansion joint comprising a pair of tubular joint members slidable one within the other, the outer joint member having a portion of enlarged diameter forming an annular chamber between the members, a flexible tubular sealing member located in the annular chamber providing a seal between the inner and outer joint members, an annular ring slidable in the chamber beyond the flexible member, and stops in the chamber cooperating with said ring to limit longitudinal movement of the joint members, said annular ring being secured to the inner joint member.

7. An expansion joint comprising a pair of tubular joint members slidable one within the other, the outer joint member having a portion of enlarged diameter forming an annular chamber between the members, a flexible tubular metallic sealing member for the joint located in the annular chamber, and auxiliary sealing means between the inner and outer joint members located inwardly of the flexible sealing member.

8. An expansion joint comprising a pair of tubular joint members slidable one within the other, the outer joint member having a portion of enlarged diameter forming an annular chamber between the members, a flexible tubular metallic sealing member for the joint in the annular chamber, the inner and outer joint members having portions in sliding contact between the flexible member and the interior of the joint, and packing rings between the last-mentioned portions secured to one of the members and forming a sealing contact with the other adapted to prevent free communication between the flexible sealing member and the interior of the joint.

9. An expansion joint comprising a pair of tubular joint members slidable one within the other, the outer joint member having a portion of enlarged diameter intermediate its ends constituting a closed annular chamber, a flexible sealing member for the joint located in said chamber, the inner and outer joint members having sliding contact beyond both ends of the annular chamber so that they will mutually support and guide each other during their relative longitudinal movement, and auxiliary sealing means in the form of packing elements between the inner and outer joint members beyond both ends of the flexible sealing member.

ARTHUR J. SLADE.